United States Patent
Kim et al.

(10) Patent No.: US 9,660,509 B2
(45) Date of Patent: May 23, 2017

(54) LINEAR VIBRATION ACTUATOR

(71) Applicant: SAMSUNG ELECTRO-MECHANICS CO., LTD., Gyeonggi-Do (KR)

(72) Inventors: Yong Tae Kim, Gyeonggi-Do (KR); Jung Kyu Yim, Gyeonggi-Do (KR); Ki Young Lee, Gyeonggi-Do (KR)

(73) Assignee: MPLUS CO., LTD., Suwon-si, Gyeonggi-Do (KR)

( * ) Notice: Subject to any disclaimer, the term of this patent is extended or adjusted under 35 U.S.C. 154(b) by 305 days.

(21) Appl. No.: 14/587,105

(22) Filed: Dec. 31, 2014

(65) Prior Publication Data

US 2015/0194870 A1    Jul. 9, 2015

(30) Foreign Application Priority Data

Jan. 8, 2014    (KR) .......................... 10-2014-0002482

(51) Int. Cl.
*H02K 33/18*    (2006.01)
*H02K 33/00*    (2006.01)

(52) U.S. Cl.
CPC ............. *H02K 33/18* (2013.01); *H02K 33/00* (2013.01)

(58) Field of Classification Search
CPC ................................ H02K 33/18; H02K 33/00
USPC .............................. 310/12.01, 15, 17, 20, 25
IPC ....................................................... H02K 33/18
See application file for complete search history.

(56) References Cited

U.S. PATENT DOCUMENTS

| | | | | |
|---|---|---|---|---|
| 7,671,493 B2* | 3/2010 | Takashima | ............. | B06B 1/045 310/12.16 |
| 2011/0018364 A1* | 1/2011 | Kim | ...................... | H02K 33/18 310/17 |
| 2011/0018365 A1* | 1/2011 | Kim | ...................... | B06B 1/045 310/17 |
| 2014/0055006 A1* | 2/2014 | Oh | ........................ | H02N 2/001 310/329 |
| 2014/0070667 A1* | 3/2014 | Oh | ....................... | B06B 1/0644 310/326 |
| 2015/0194870 A1* | 7/2015 | Kim | ...................... | H02K 33/18 310/25 |

FOREIGN PATENT DOCUMENTS

| | | |
|---|---|---|
| JP | 2011-230067 A | 11/2011 |
| KR | 101046003 B1 | 6/2011 |
| KR | 1020120049204 A | 5/2012 |
| KR | 101157868 B1 | 6/2012 |
| KR | 10-2012-0121284 A | 11/2012 |

OTHER PUBLICATIONS

KR10-2014-0002482 Office Action dated Feb. 4, 2015; 8pgs.
SIPO Office Action for Chinese Application No. 201410852127.6.

* cited by examiner

*Primary Examiner* — John K Kim
(74) *Attorney, Agent, or Firm* — LRK Patent Law Firm

(57) ABSTRACT

Embodiments of the invention provide a motor assembly including a terminal provided at a stator of a motor and electrically connected to a coil wound around the stator, and a controller formed with a coupling hole to which the terminal is coupled and electrically connected and controlling electric input and output to the terminal.

13 Claims, 4 Drawing Sheets

LINEAR VIBRATION ACTUATOR

CROSS REFERENCE TO RELATED APPLICATION

This application claims the benefit of and priority under 35 U.S.C. §119 to Korean Patent Application No. KR 10-2014-0002482, entitled "LINEAR VIBRATION ACTUATOR," filed on Jan. 8, 2014, which is hereby incorporated by reference in its entirety into this application.

BACKGROUND

Field of the Invention

The present invention relates to a linear vibration actuator, and more particularly, to a bar type linear vibration actuator.

Description of the Related Art

Generally, in portable electronic devices, such as a portable phone, an e-book terminal, a game machine, or a portable multimedia player (PMP), for example, a vibration function has been utilized for various applications.

In particular, a vibration generating apparatus for generating the vibration has been mainly equipped in the portable electronic device to be used as an alert function that is a soundless receiving signal.

To keep pace with multi-functionalization of the portable electronic device, a demand for a miniaturized, integrated, and multi-functional vibration generating apparatus is being increased.

Recently, the portable electronic device has generally adopted a touch type device which touches and inputs the portable electronic device according to the user demand which wishes to simply use the portable electronic device and may use a haptic module which is a kind of sensation interface so as to make the user more easily and conveniently communicate with a computer or a program. The haptic signifying "tactile recognition" widely includes a concept of more diversifying a feedback for a touch by reflecting a user's intuitive experience on an interface, in addition to a concept of a touch input which is an input technology.

Korean Patent Publication No. 10-2012-0049204 describes a conventional coin type linear vibrator, which provides an inner space having a predetermined size through cylindrical upper case and lower case and has a fixed part and a vibrating part disposed therein.

The linear vibrator disclosed in Korean Patent Publication No. 10-2012-0049204 has a cylindrical shape as described above and thus needs to keep a predetermined diameter to accommodate components. Thus, considering characteristics of the portable electronic device, miniaturization and thinness of the portable electronic device cannot but have a limitation due to the coin type linear vibrator.

SUMMARY

Accordingly, embodiments of the invention have been made to provide an elongated bar type linear vibration actuator capable of effectively generating vibration as needed while minimizing an occupied space within a portable electronic device.

According to an embodiment of the invention, a bar type linear vibration actuator includes a case having an opened one side and an inner space formed therein, a magnet extending vertically down from an inner side of an upper portion of the case, a cover member coupled with the opened one side of the case to shield the inner space of the case, a vibration plate disposed in the case and the cover member to be vertically driven, a coil fixedly positioned on a lower surface of the vibration plate to face the magnet and generating a magnetic field by being applied with power from the outside, and weight bodies fixedly coupled with both ends of the vibration plate.

According to an embodiment of the invention, the vibration plate has a flat plate shape and includes a narrow width part and two wide width parts, which are bilaterally symmetrical based on the narrow width part.

According to an embodiment of the invention, a lower surface of the narrow width part is provided with a yoke and the coil is wound around the yoke to be disposed to face a magnet attached to the case.

According to an embodiment of the invention, the narrow width part is used as a through path of the magnet, which extends vertically down and provides a gap between the coil and the magnet.

According to an embodiment of the invention, the magnet is configured of two magnets arranged in parallel with each other at the inner side of the upper portion of the case.

To add vibration power of the linear vibration actuator, the two weight bodies are disposed to be bilaterally symmetrical based on a central portion and/or a narrow width part of the linear vibration actuator and the weight body are disposed on a lower surface of the wide width part of the vibration plate.

According to an embodiment of the invention, the vibration plate has brackets additionally disposed at both sides of the wide width part so as to be coupled with the weight body in a spaced state. The bracket supports the weight body.

According to an embodiment of the invention, an upper surface of the weight body is formed to be inclined down from one side toward the other side. Due to a unique shape of the weight body, the weight body does not contact the vibration plate when the vibration plate flexurally vibrates in a vertical direction of the vibration plate so as to vibrate to a resonance frequency.

To secure a reliably vertical displacement of the vibration plate, the case is provided with a stepped part and the vibration plate is fixedly coupled with the stepped part of the case.

According to an embodiment of the invention, the inner side of the upper portion of the case facing the narrow width part of the vibration plate is provided with a damper member to buffer an unexpected collision between the vibration plate and the case. The damper member is disposed between the two magnets.

According to an embodiment of the invention, the upper surface of the cover member is further provided with the damper member to buffer a collision between the magnet or the coil of the vibration plate, thereby previously preventing a breakage or a damage of components.

Various objects, advantages and features of the invention will become apparent from the following description of embodiments with reference to the accompanying drawings.

BRIEF DESCRIPTION OF DRAWINGS

These and other features, aspects, and advantages of the invention are better understood with regard to the following Detailed Description, appended Claims, and accompanying Figures. It is to be noted, however, that the Figures illustrate only various embodiments of the invention and are therefore not to be considered limiting of the invention's scope as it may include other effective embodiments as well.

DETAILED DESCRIPTION

Figure 1:
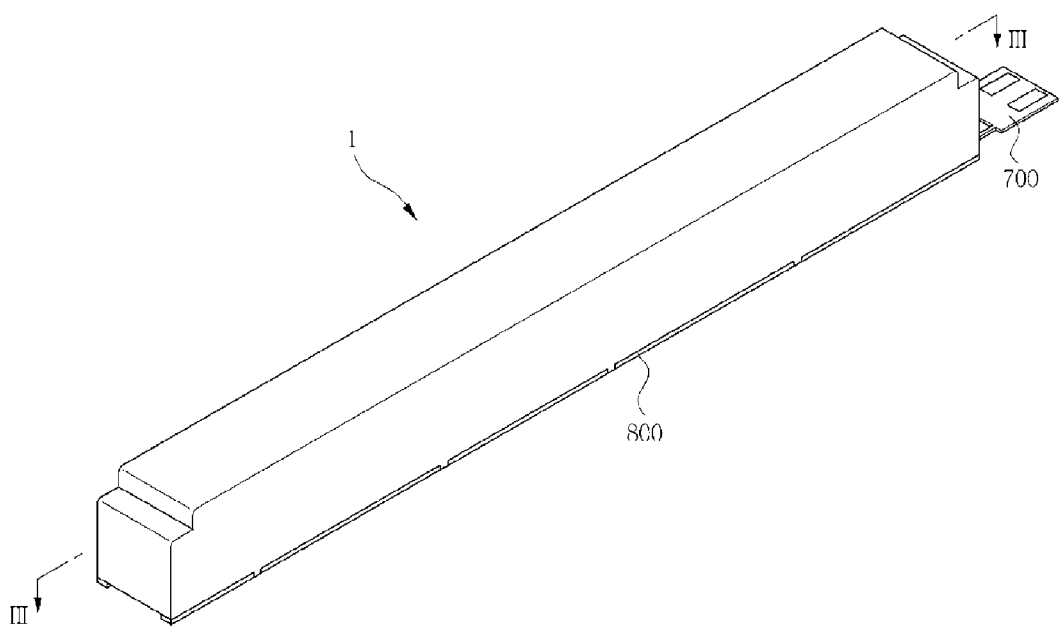
FIG. 1 is a top perspective view of a linear vibration actuator according to an embodiment of the invention.
Figure 2:
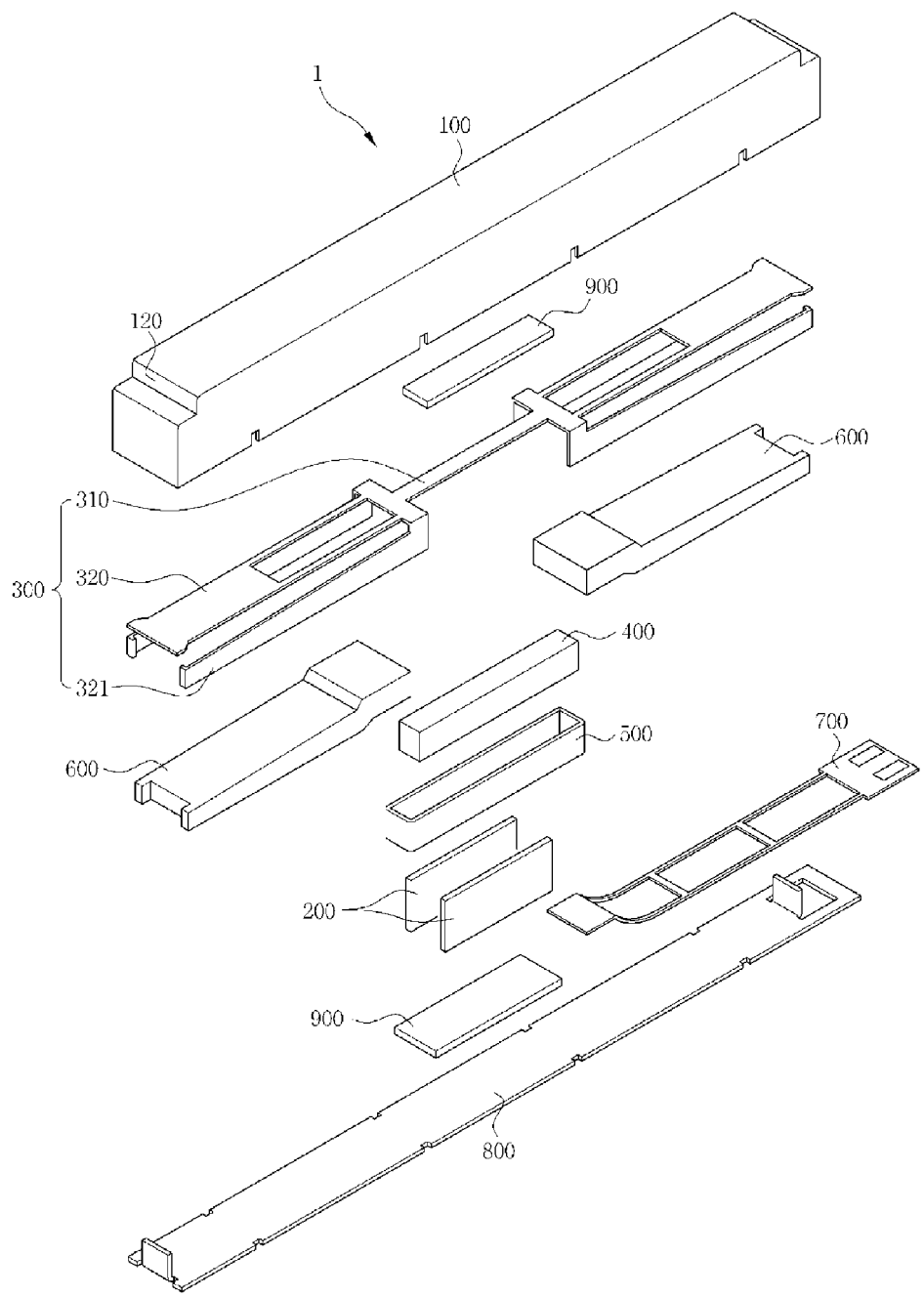
FIG. 2 is an exploded perspective view of the linear vibration actuator illustrated in FIG. 1 according to an embodiment of the invention.
Figure 3:
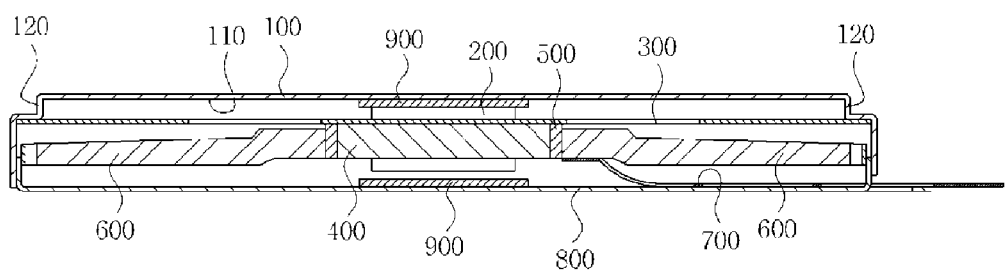
FIG. 3 is a cross-sectional view of the linear vibration actuator taken along the line III-III of FIG. 1 according to an embodiment of the invention.
Figure 4:
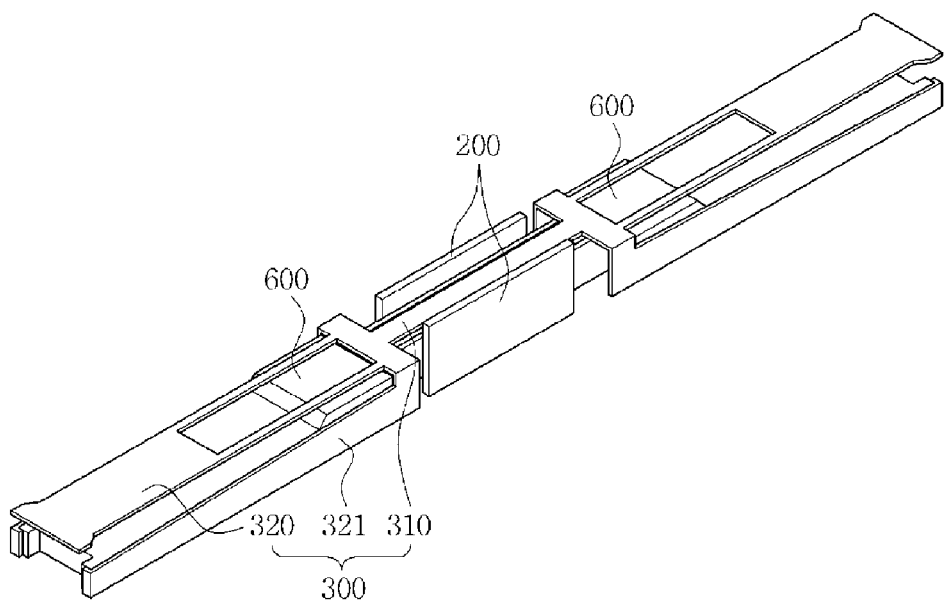
FIG. 4 is a top view of inner components of the linear vibration actuator from which a case and a cover member are excluded according to an embodiment of the invention.
Figure 5:
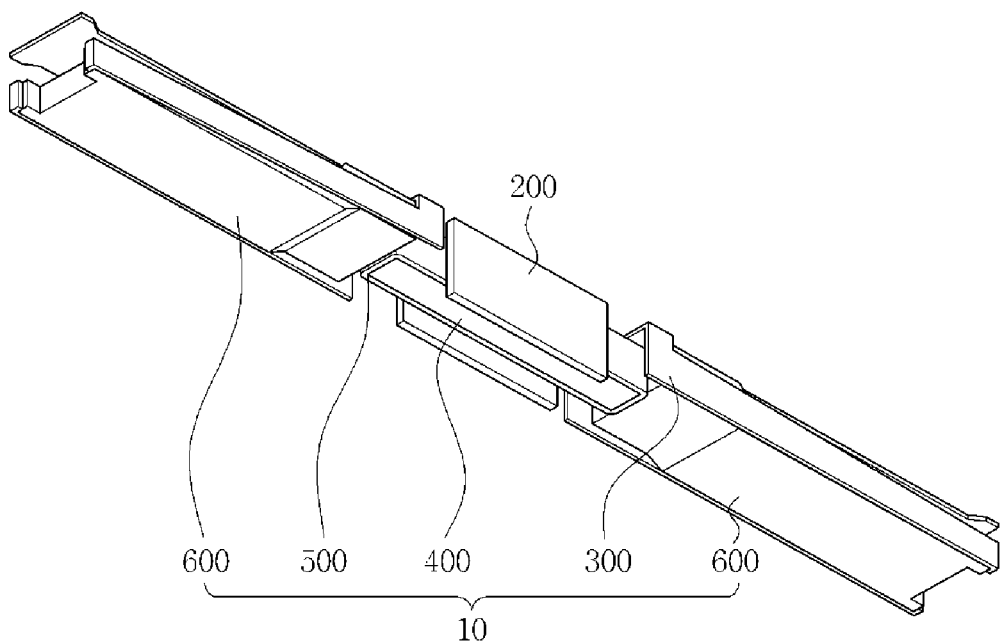
FIG. 5 is a bottom view of the inner components of the linear vibration actuator from which the case and the cover member are excluded according to an embodiment of the invention.

Advantages and features of the present invention and methods of accomplishing the same will be apparent by referring to embodiments described below in detail in connection with the accompanying drawings. However, the present invention is not limited to the embodiments disclosed below and may be implemented in various different forms. The embodiments are provided only for completing the disclosure of the present invention and for fully representing the scope of the present invention to those skilled in the art.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Like reference numerals refer to like elements throughout the specification.

Hereinafter, various embodiments of the present invention will be described in detail with reference to the accompanying drawings.

In summary, a linear vibration actuator 1 according to an embodiment of the invention vibrates by an electromagnetic force, which is generated by an interaction of a magnet 200 with a coil 500 providing a current having a predetermined frequency to a position corresponding to the magnet 200, thereby generating vibrations.

linear vibration actuator 1 according to the exemplary embodiment of the present disclosure is enclosed with a case 100 and a cover member 800 and includes a magnet 200, a vibration plate 300, a yoke 400, a coil 500, a weight body 600, a printed circuit board 700, and the like which are disposed therein.

According to an embodiment of the invention, the case 100 is formed in a rectangular shape, but has a box shape of which the one side is opened. As illustrated, a lower surface of the case 100 is also opened.

According to an embodiment of the invention, the inner space of the case 100 has an enough size to accommodate the weight body 600 for increasing vibration power along with a vibrator 10, in other words, the vibration plate 300 mounted with the coil 500.

According to an embodiment of the invention, the vibration plate 300 has an elongated plate shape in which the yoke 400, the coil 500, and the weight body 600 are mounted, in which the yoke 400, the coil 500, and the weight body 600, which are described above, are disposed on a lower surface of the vibration plate 300. In particular, the weight bodies 600 are disposed at both ends of the vibration plate 300, respectively, while the yoke 400 and the coil 500 are disposed at a central portion of the lower surface of the vibration plate 300. In detail, the weight bodies 600 are mounted or disposed at a predetermined interval in the lower surface of the vibration plate 300.

Further, the vibration plate 300, according to an embodiment of the invention, is spaced apart from the case 100 in parallel at a predetermined interval. Preferably, the case 100 has both ends provided with stepped parts 120. The vibration plate 300 is fixedly coupled on the stepped part 120 of the case 100. The stepped part 120 provides a space between the vibration plate 300 and the case 100. Thus, the stepped part 120 secures a vertical vibration displacement of the vibration plate 300 within the case 100 and a cover member 800, thereby generating a vibration volume of the linear vibration actuator 1 according to an embodiment of the invention.

When being applied with power, the coil 500 disposed to face the magnet 200 is fixed to a center of the vibration plate 300, for example, a narrow width part 310 to generate a moment at the center of the vibration plate 300 by an electromagnetic force. Since the moment is generated in the state in which the vibration plate 300 is fixed to both ends of the case 100, in detail, the stepped parts 120, the central portion of the vibration plate 300 vertically vibrates.

In addition, the vibration plate 300 is configured of a narrow width part 310 and two wide width parts 320. The narrow width part 310 connects between the two wide width parts 320 and serves as a bridge connecting between the two wide width parts 320 in a line. The wide width part 320 is formed to be smaller than an inner width of the case 100. Unlike this, the narrow width part 310 is formed to be narrower than a width of the wide width part 320. In other words, a difference between a size of the wide width part 320 and a size of the narrow width part 310 provides a space to accommodate the magnet 200. According to an embodiment of the invention, the narrow width part 310 uses a through path of the magnet, which extends vertically down from an inner side of an upper portion of the case, and thus the magnet 200 extends up to a bottom end of the coil 500.

According to an embodiment of the invention, the vibration plate 300 is a single component in which the narrow width part 310 and the wide width part 320 are integrally formed.

As illustrated, the weight bodies 600 are each disposed on a lower surface of the wide width part 320, while the yoke 400 and the coil 500 are mounted on a lower surface of the narrow width part 310. A width of the narrow width part 310 has a smaller size than a spaced distance between two facing magnets 200, and thus does not affect a vertical motion of the vibrator 10.

According to an embodiment of the invention, the coil 500 is wound around the yoke 400 and is electrically connected to the printed circuit board 700, such that the coil 500 is applied with power to generate a magnetic force. When the coil 500 vibrates the electromagnetic force, a magnetic flux passing through the coil 500 from the magnet 200 is formed in a horizontal direction and a magnetic field generated by the coil 500 is formed in a vertical direction, such that the vibration plate 300 vertically vibrates. Therefore, a magnetic flux direction of the magnet 200 and a vibration direction of the vibrator 10 are vertical to each other. In summary, the coil 500 forms a magnetic field along with the magnet 200 to make the vibration plate 300 vibrate vertically.

According to an embodiment of the invention, the yoke 400 has a bar shape and the coil 500 is wound around an outer peripheral surface of the yoke 400. The yoke 400 collecting the magnetic flux of the magnet 200 is made of the same material as the vibration plate 300 and thus keeps a reliably coupled state with the vibration plate 300. According to an embodiment of the invention, the yoke 400 and the vibration plate 300 are made of a magnetic material to provide a magnetic flux path between the magnet 200 and the coil 500.

As described above, the yoke 400 is formed in the bar type and thus, according to an embodiment of the invention, is fixed on the lower surface of the narrow width part 310 of the coil 500.

According to an embodiment of the invention, the magnet 200 generating the magnetic flux is fixed to an inner side 110 of the upper portion of the case 100, but is disposed vertically down from the center of the inner side 110 of the upper portion of the case 100 to be positioned to face the coil 500. Preferably, the two magnets 200 are disposed down from the inner side 110 of the upper portion of the case 100 at a predetermined interval but the narrow width part 310 of the vibration plate 300 is interposed between the two spaced magnets 200 to make the magnet 200 and the coil 500 be disposed to face each other. According to an embodiment of the invention, the two magnets 200 are disposed to be spaced apart from each other at a predetermined gap, having the coil 500 interposed therebetween, and as a result, the vibrator 10 reliably performs a translational motion in a vertical direction.

Selectively, an outer peripheral surface of the magnet 200 is applied with a magnetic fluid (not illustrated). The magnetic fluid prevents a direct collision between the coil 500 and the magnet 200 due to the vibrator 10 horizontally shaking by an external impact such as dropping and minimize minor vibrations generated when the vibrator 10 vibrates vertically. As widely known, the magnetic fluid serves to collect the magnetic flux of the magnet 200.

According to an embodiment of the invention, the weight body 600 is coupled with the vibration plate 300, in detail, brackets 321 extending vertically down from both sides of the wide width part 320 of the vibration plate 300 to add a load to the vibration plate 300. As illustrated, the two weight bodies 600 are disposed to be bilaterally symmetrical based on the narrow width part 310 of the vibration plate 300. The bracket 321 and the vibration plate 200 are formed of an integrated single component or is fixedly coupled with each other in various bonding schemes.

In detail, the bracket 321 disposes the weight body 600 to be spaced apart from one surface, the lower surface of the vibration plate 300. In order to prevent make the weight body 600 contact the vibration plate 300, which performs the translational motion in the vertical direction, the upper surface of the weight body 600 is formed to be inclined down from one side toward the other side.

According to an embodiment of the invention, the weight body 600 is made of a metal material, preferably, a tungsten material having relatively higher density in the same volume.

According to an embodiment of the invention, the cover member 800 is formed in an elongated flat plate but has an enough size and shape to close the opened one side, for example, the opened lower surface of the case 100 and thus is coupled with the opened one side of the case 100, thereby shielding the inner space of the case 100. Further, one surface of the cover member 800 is provided with the printed circuit board 700, which is electrically connected to the coil 500. According to an embodiment of the invention, the printed circuit board 700 is provided as flexible printed circuit board (FPCB).

According to another embodiment of the invention, the case 100 and the cover member 800 are coupled to each other in various schemes, such as caulking, welding, or bonding, as non-limiting examples, which are well known to those skilled in the art.

In addition, according to various embodiments of the invention, to minimize the impact force depending on the contact between the vibrator 10 and other components due to a drop impact or an increase in driving displacement of the vibration plate 300, a damper member 900 is provided. According to an embodiment of the invention, the damper member 900 is disposed on the inner side 110 of the upper portion of the case 100 and is disposed at a central portion facing the narrow width part 310 of the vibration plate 300. In addition, the damper member 900 is disposed on the upper surface of the cover member 800 and is disposed at the central portion facing the narrow width part 310 of the vibration plate 300.

As set forth above, according to various embodiments of the invention, it is possible to provide the linear vibration actuator which is formed in the elongated bar type to minimize the occupied space required for mounting.

Further, according to various embodiments of the invention, it is possible to form the linear vibration actuator in the bar type to be mounted in the narrow space, thereby maximizing the space efficiency of the portable electronic device.

In addition, according to various embodiments of the invention, it is possible to have the structure to minimize the generation of the unnecessary magnetic field to improve the electromagnetic force, thereby improving the vibration power.

Terms used herein are provided to explain embodiments, not limiting the present invention. Throughout this specification, the singular form includes the plural form unless the context clearly indicates otherwise. When terms "comprises" and/or "comprising" used herein do not preclude existence and addition of another component, step, operation and/or device, in addition to the above-mentioned component, step, operation and/or device.

Embodiments of the present invention may suitably comprise, consist or consist essentially of the elements disclosed and may be practiced in the absence of an element not disclosed. For example, it can be recognized by those skilled in the art that certain steps can be combined into a single step.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe the best method he or she knows for carrying out the invention.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The singular forms "a," "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

As used herein, the terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "according to an embodiment" herein do not necessarily all refer to the same embodiment.

Ranges may be expressed herein as from about one particular value, and/or to about another particular value. When such a range is expressed, it is to be understood that another embodiment is from the one particular value and/or to the other particular value, along with all combinations within said range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

What is claimed is:

1. A linear vibration actuator comprising:
   a case comprising an opened one side and an inner space formed therein;
   a magnet extending vertically down from an inner side of an upper portion of the case;
   a cover member coupled with the opened one side of the case to shield the inner space of the case;
   a vibration plate disposed to be vertically vibrated within the inner space of the case and above the cover member;
   a coil fixedly positioned on a lower surface of the vibration plate to face the magnet and generating a magnetic field by being applied with power from the outside; and
   a plurality of weight bodies fixedly coupled with both ends of the vibration plate,
   wherein the vibration plate comprises a narrow width piece and two wide width pieces, the two wide width pieces being symmetrically disposed on both sides of the narrow width piece, and the narrow width piece serving as a bridge between the two wide width pieces to connect the two wide width pieces to each other.

2. The linear vibration actuator of claim 1, wherein the narrow width piece comprises a yoke and the coil is wound around the yoke.

3. The linear vibration actuator of claim 1, wherein the narrow width piece is provided as a through path of the magnet.

4. The linear vibration actuator of claim 1, wherein the magnet is configured of two magnets arranged in parallel with each other at the inner side of the upper portion of the case.

5. The linear vibration actuator of claim 1, wherein the weight body is coupled with the wide width piece.

6. The linear vibration actuator of claim 1, wherein the vibration plate has brackets additionally disposed at both sides of the wide width piece.

7. The linear vibration actuator of claim 6, wherein the weight bodies are supported by the brackets and are spaced apart from the lower surface of the vibration plate at a predetermined interval.

8. The linear vibration actuator of claim 1, wherein an upper surface of the weight body is formed to be inclined down from one side toward the other side.

9. The linear vibration actuator of claim 1, wherein both ends of the case are provided with stepped parts.

10. The linear vibration actuator of claim 9, wherein the vibration plate is fixedly coupled with the stepped part of the case.

11. The linear vibration actuator of claim 1, wherein the inner side of the upper portion of the case is further provided with a damper member.

12. The linear vibration actuator of claim 11, wherein the damper member is disposed between the two magnets.

13. The linear vibration actuator of claim 1, wherein the cover member is further provided with a damper member.

* * * * *